United States Patent [19]
Yu et al.

[11] Patent Number: 6,005,038
[45] Date of Patent: Dec. 21, 1999

[54] OPTICAL ALIGNMENT COMPOSITION, ALIGNMENT LAYER FORMED USING THE SAME AND LCD HAVING THE ALIGNMENT LAYER

[75] Inventors: Han-sung Yu, Suwon; Byung-hoon Chae, Seoul, both of Rep. of Korea

[73] Assignee: Samsung Display Devices Co., Ltd., Kyungki-do, Rep. of Korea

[21] Appl. No.: 08/988,987

[22] Filed: Dec. 11, 1997

[30] Foreign Application Priority Data

Dec. 17, 1996 [KR] Rep. of Korea ............ 96-66931

[51] Int. Cl.$^6$ .................................. C08K 5/05
[52] U.S. Cl. ............................ 524/380; 349/124
[58] Field of Search .................... 524/475, 380

[56] References Cited

U.S. PATENT DOCUMENTS

| | | | |
|---|---|---|---|
| 3,864,308 | 2/1975 | Kato | 260/47 |
| 3,992,356 | 11/1976 | Jacquet | 260/47 |
| 4,546,067 | 10/1985 | Irving | 430/325 |
| 4,696,990 | 9/1987 | Noonan | 526/304 |
| 4,701,497 | 10/1987 | Serizawa | 525/292 |
| 5,484,821 | 1/1996 | Mandal | 522/26 |

*Primary Examiner*—Paul R. Michl
*Attorney, Agent, or Firm*—Lowe Hauptman Gopstein Gilman & Berner

[57] ABSTRACT

An optical alignment composition, an alignment layer formed using the same with an excellent thermal stability, and an LCD having the alignment layer are provided. The optical alignment composition includes a multifunctional cinnamate compound and a cinnamate group containing polymer in a weight ratio of 1:9 to 2:8. Thus, an optical alignment composition and an alignment layer each having excellent thermal stability and alignment property can be obtained while adopting a non-destructive optical alignment method. Accordingly, an LCD with improved performance can be obtained.

9 Claims, 1 Drawing Sheet

OPTICAL ALIGNMENT COMPOSITION, ALIGNMENT LAYER FORMED USING THE SAME AND LCD HAVING THE ALIGNMENT LAYER

BACKGROUND OF THE INVENTION

1. Field of the Invention

The present invention relates to a liquid crystal display device (LCD), and more particularly, to an optical alignment composition, an alignment layer formed using the optical alignment composition, and an LCD having the alignment layer.

2. Description of the Related Art

In general, a liquid crystal has an intermediate property of a liquid and a solid, having the fluidity of a liquid and having the optical property of a solid, and can be changed in its optical anisotropy by an electrical field or heat. A liquid crystal display device (LCD) utilizes such properties. FIG. 1 is a sectional view of a general LCD.

Referring to FIG. 1, transparent electrodes 3 and 3' made of indium tin oxide (ITO) are formed on a pair of transparent substrates 2 and 2' made of glass. Insulating layers 4 and 4' and alignment layers 5 and 5' for aligning liquid crystals are sequentially formed on the transparent electrodes 3 and 3'. A spacer 6 for maintaining a constant cell gap is interposed between the alignment layers 5 and 5'. A liquid crystal material is injected into the cell gap to form a liquid crystal layer 7. Polarizing plates 1 and 1' for polarizing entering and transmitting lights are provided at the exterior of the substrates 2 and 2'.

One of the determining factors in the performance of an LCD is an appropriate alignment of liquid crystals. Alignment layers are generally used for the purpose of aligning liquid crystals appropriately. Among them, conventionally, the alignment layer formed by rubbing a polymer layer has been widely used. However, according to the rubbing treatment, dust or static electricity may be generated due to mechanical contact between a rubbing cloth and the alignment layer.

Thus, to solve the problem caused by the rubbing treatment, a non-destructive optical alignment technology has been developed. According to this technology, polarized light is irradiated into a photopolymeric alignment layer, causing anisotropic photopolymerization. As a result, liquid crystal molecules are uniformly aligned.

As the material of a photopolymeric alignment layer, a polycinnamate such as PVCN (polyvinyl cinnamate) or PVMC (polyvinyl methoxycinnamate) has been used. However, such polymers have poor thermal stability, although they have an excellent optical alignment property. In other words, the thermal stability of an alignment layer depends upon that of the polymer, which depends upon a glass transition temperature and cross linking density. Since the polycinnamate generally has a glass transition temperature of 100° C. or below and is difficult to subject to a photo-reaction of 50% or more in a solid state, increasing the cross linking density is limited, which weakens the thermal stability of the alignment layer.

SUMMARY OF THE INVENTION

To solve the above problem(s), it is an object of the present invention to provide an optical alignment composition having excellent thermal stability.

It is another object of the present invention to provide an alignment layer formed of the optical alignment composition having excellent thermal stability.

It is still another object of the present invention to provide a liquid crystal display device (LCD) having the alignment layer.

Accordingly, to achieve the first object, there is provided an optical alignment composition including a multifunctional cinnamate compound and a cinnamate group containing polymer in a weight ratio of 1:9 to 2:8.

The second object of the present invention is achieved by an alignment layer including a multifunctional cinnamate compound and a cinnamate group containing polymer in a weight ratio of 1:9 to 2:8.

The third object of the present invention is achieved by an LCD having the alignment layer including a multifunctional cinnamate compound and a cinnamate group containing polymer in a weight ratio of 1:9 to 2:8.

It is preferable that the multifunctional cinnamate compound has two to four cinnamate groups and is selected from the group consisting of $C_2$–$C_6$ alkyldiol dicinnamate, $C_2$–$C_6$ alkyltriol tricinnamate and $C_2$–$C_6$ alkyltetraol tetracinnamate.

Although the cinnamate group containing polymer is not specifically restricted, it is preferably selected from the group consisting of poly(vinylcinnamate) (PVCN), poly (vinylmethoxycinnamate) (PVMC) and polyimide having a cinnamate group in its side chain, and the weight-average molecular weight thereof is preferably 5,000 to 200,000.

In the present invention, the mixing ratio of the cinnamate compound to the cinnamate group containing polymer is preferably in the range between 1:9 and 2:8. This is because excellent thermal stability and optical alignment are exhibited within the range.

BRIEF DESCRIPTION OF THE DRAWING(S)

The above objects and advantages of the present invention will become more apparent by describing in detail a preferred embodiment thereof with reference to the attached drawing in which:

FIG. 1 is a section view of a general liquid crystal display.

DESCRIPTION OF THE PREFERRED EMBODIMENT(S)

Figure 1:
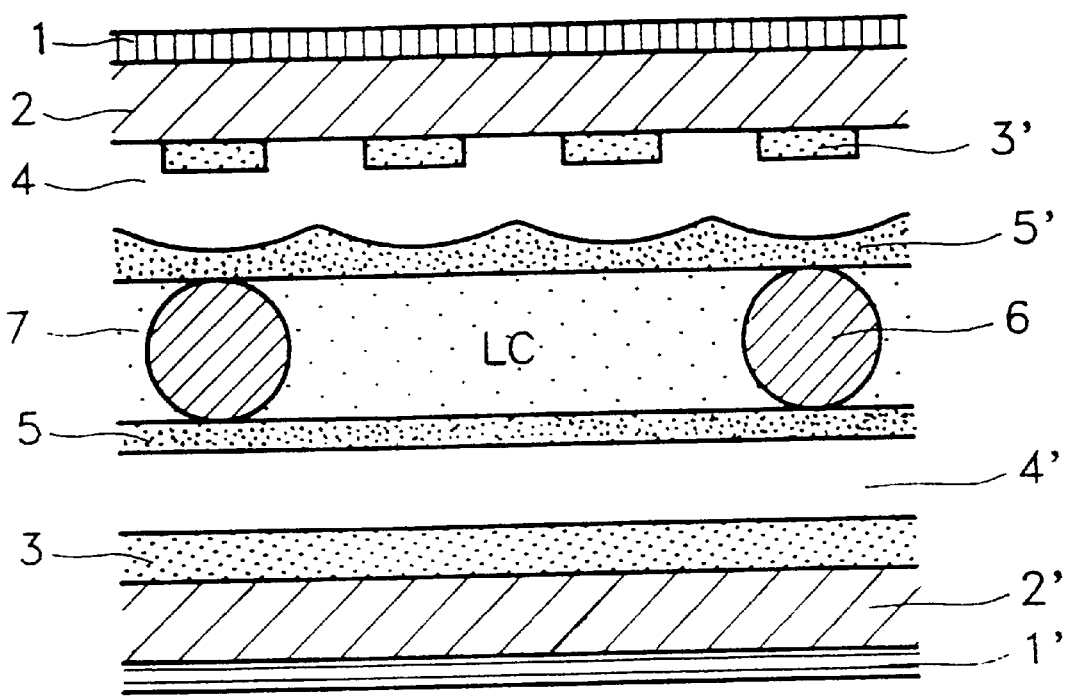

In the present invention, an optical alignment composition having excellent thermal stability, an alignment layer formed using the same, and an LCD having the alignment layer are provided. Now, the manufacturing method thereof will be described.

First, as an example of the multifunctional cinnamate compound, pentaerythritol tetracinnamate is produced by mixing pentaerythritol and cinnamoyl chloride with tetrahydrofuran and adding pyridine thereto and reacting the resultant composition. The produced multifunctional cinnamate compound and the cinnamate group containing polymer are mixed in a weight ratio of 1:9 to 2:8 and mixed with an appropriate solvent to produce an optical alignment composition. At this time, as the cinnamate group containing polymer, PVCN, PVMC or polyimide having a cinnamate group in its side chain can be used, and it is preferable that a polymer having a weight-average molecular weight of 5,000 to 200,000 is used. The solvent is preferably selected among N-methylpyrrolidone (NMP), dimethylformamide (DMF) and butylcellosolve, although not specifically restricted thereto. The composition is coated on two glass substrates where electrodes are formed, respectively, and then the solvent is dried to produce an alignment layer. Subsequently, linear polarized light is irradiated into the alignment layer for a photo-reaction. Then, two glass substrates are adhered while maintaining a predetermined gap therebetween using a spacer, and liquid crystals are injected into the gap, thereby completing the LCD.

Hereinbelow, the present invention will be described in more detail through detailed embodiments.

SYNTHETIC EXAMPLE

Synthesis of Multifunctional Cinnamate Compound (pentaerythritol tetracinnamate)

100 ml of tetrahydrofuran was mixed with 13.6 g of pentaerythritol and 17 g of cinnamoyl chloride and then 3 g of pyridine was added thereto to react the resultant at room temperature for 2 hours and then at 60° C. for 1 hour. After the reaction, the resultant was cooled and the unreacted ingredients and a pyridine salt as a byproduct were removed to then be recrystallized, thereby obtaining pentaerythritol tetracinnamate.

Example 1

0.03 g of pentaerythritol tetracinnamate compound produced in Synthetic Example was dissolved in 10 ml of NMP and then 0.27 g of PVCN (mfg. by Aldrich Industries, Ltd.) was added, thereby manufacturing an optical alignment composition. The composition was spin-coated on two glass substrates and then NMP was evaporated and removed at 100° C. for about 1 hour, thereby producing an alignment layer. Subsequently, linear polarized light of 313 nm wavelength was irradiated into the alignment layer to conduct a photo-reaction for about 5 minutes. Then, two glass substrates were adhered while maintaining a predetermined gap therebetween using a spacer, and liquid crystals (commercially available by the trade name of ZLI 22 mfd. by Merck & Co., Ltd.) were injected into the gap, thereby completing the LCD.

Example 2

With the exception of 0.06 g of pentaerythritol tetracinnamate and 0.24 g of PVCN being used, an LCD was fabricated in the same manner as described in Example 1.

Example 3

With the exception of 0.03 g of pentaerythritol tetracinnamate and 0.27 g of PVMC, instead of PVCN, being used, an LCD was fabricated in the same manner as described in Example 1.

Example 4

With the exception of 0.06 g of pentaerythritol tetracinnamate and 0.24 g of PVMC, instead of PVCN, being used, an LCD was fabricated in the same manner as described in Example 1.

Example 5

With the exception of 0.03 g of pentaerythritol tetracinnamate and 0.27 g of polyimide containing a cinnamate group in its side chain, instead of PVCN, being used, an LCD was fabricated in the same manner as described in Example 1.

Comparative Example 1

With the exception of pentaerythritol tetracinnamate not being added, an LCD was fabricated in the same manner as described in Example 1.

Comparative Examples 2–5

With the exception of 0.09 g and 0.21 g (Comparative Example 2), 0.12 g and 0.18 g (Comparative Example 3), 0.15 g and 0.15 g (Comparative Example 4), and 0.18 g and 0.12 g (Comparative Example 5) of pentaerythritol tetracinnamate and PVCN, being used, respectively, an LCD was fabricated in the same manner as described in Example 1.

Then, with respect to the LCDs manufactured according to Examples and Comparative Examples, the alignment degree and the thermal stability of the alignment layer were measured. The alignment degree was observed by a polarizing film. The thermal stability was measured by aging while raising the temperature (up to about 200° C.), lowering the temperature to room temperature, and then observing the deformation degree of the alignment layer by a polarizing film.

As a result, the LCDs manufactured according the Examples had an excellent alignment property and had thermal stability so excellent that the alignment layer scarcely transformed even when the temperature was raised to 200° C. However, the LCD manufactured according to Comparative Example 1 had an excellent alignment property, but had poor thermal stability so that the alignment layer was deformed starting at about 80° C. In the case of the LCDs manufactured according to Comparative Examples 2 through 5, the thermal stability thereof was somewhat improved, but the alignment property thereof was at an intermediate level or below.

As described above, according to the present invention, an optical alignment composition and an alignment layer each having excellent thermal stability and alignment property can be obtained while adopting a non-destructive optical alignment method. Accordingly, an LCD with improved performance can be obtained.

What is claimed is:

1. An optical alignment composition comprising:
   A. a multifunctional cinnamate compound selected from the group consisting of $C_2$–$C_6$ alkyldiol dicinnamate, $C_2$–$C_6$ alkyltriol tricinnamate, and $C_2$–$C_6$ alkyltetraol tetracinnamate: and
   B. a cinnamate group containing polymer in a weight ratio of 1:9 to 2:8.

2. The optical alignment composition of claim 1, wherein the cinnamate group containing polymer is selected from the group consisting of poly(vinylcinnamate) (PVCN), poly(vinylmethoxycinnamate) (PVMC) and polyimide having a cinnamate group in its side chain.

3. The optical alignment composition of claim 2, wherein the cinnamate group containing polymer has a weight-average molecular weight in the range of 5,000 to 200,000.

4. An alignment layer comprising:
   A. at least one multifunctional cinnamate compound selected from the group consisting of $C_2$–$C_6$ lkldiol dicinnamate, $C_2$–$C_6$ alkyltriol tricinnamate, and $C_2$–$C_6$ alkyltetraol tetracinnamate: and
   B. at least one cinnamate group containing polymer in a weight ratio of 1:9 to 2:8.

5. The alignment layer of claim 4, wherein the cinnamate group containing polymer is selected from the group consisting of poly(vinylcinnamate) (PVCN), poly(vinylmethoxycinnamate) (PVMC) and polyimide having a cinnamate group in its side chain.

6. The alignment layer of claim 5, wherein the cinnamate group containing polymer has a weight-average molecular weight in the range of 5,000 to 200,000.

7. In the method of optically aligning alignment layers of an LCD by irradiating such layers with polarized light, the improvement which comprises said alignment layers comprising a mixture of:
- A. at least one multifunctional cinnamate compound selected from the group consisting of $C_2$–$C_6$ alkyldiol dicinnamate, $C_2$–$C_6$ alkyltriol tricinnamate, and $C_2$–$C_6$ alkyltetraol tetracinnamate: and
- B. at least one cinnamate group containing polymer in a weight ratio of 1:9 to 2:8.

8. The improvement claimed in claim 7 wherein said polymer is at least one member selected from the group consisting of polyvinyl cinnarnate, polyvinyl methoxy cinnamate, and a polyimide having at least one cinnamate group in a side chain thereof.

9. The improvement claimed in claim 8 wherein said polymer has a weight average molecular weight of about 5,000 to 200,000.

* * * * *